June 24, 1947.  R. D. KING ET AL  2,422,833
STIFF NUT
Filed May 30, 1944
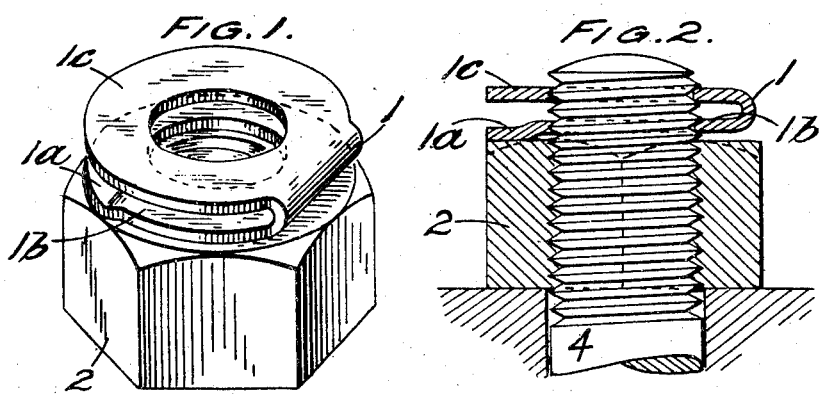
Inventors
R. D. King and N. F. Wood
BY John O. Seifert
Atty.

Patented June 24, 1947

2,422,833

UNITED STATES PATENT OFFICE 2,422,833

STIFF NUT

Ronald D. King and Norman F. Wood,
Portsmouth, England

Application May 30, 1944, Serial No. 537,983
In Great Britain May 17, 1943

Section 1, Public Law 690, August 8, 1946.
Patent expires May 17, 1963

1 Claim. (Cl. 151—30)

This invention relates to stiff nuts or nuts which grip tightly on the bolt and are in no danger of coming loose accidentally. The object of the invention is the provision of improvements in nuts of this kind, and, in accordance with the invention, a nut has mounted at one end a separately formed plate attachment having one or more openings through which the bolt passes and whereby a friction drag on said bolt is provided.

In order that the invention may be the more clearly understood a number of nut constructions in accordance therewith will now be described, reference being made to the accompanying drawings, wherein:

Figure 1 is a perspective view of one of said nut constructions;

Figure 2 is a sectional elevation of the same shown screwed on a bolt.

The embodiment of the invention comprises a spring plate 1 having a marginal portion 1a at one edge secured, by brazing, welding, riveting or other methods, flat against a corresponding marginal portion of one end surface of a nut 2 close to one of the facets thereof. From this region of securement the plate 1 is, as clearly shown, first inclined away from, and then, at 1b, turned parallel to, the said end surface of the nut, and said plate then turns back through 180° to be again parallel at 1c to the said end surface. Thus said plate 1 comprises two parts 1b and 1c both parallel to the end surface of the nut, the part 1b spaced a convenient distance from said end surface and the part 1c spaced a still further convenient distance from the part 1b. These two parallel parts 1b and 1c are formed with holes coaxial with the tapped hole in the nut, and thus, when the nut is screwed on the bolt, the latter passes through these two holes.

The two holes in the portions 1b and 1c may be tapped to fit the screw threads of a bolt 4 (Figure 2), the arrangement being such that the screw threads of the said two holes are out of phase or lead with each other and with the screw threads of the nut, and thus the bolt in screwing into the two holes strains the portion 1b of the plate from its normal position relative to the nut and also strains the portion 1c from its normal position relative to the portion 1b. This causes the threads of the two holes to drag frictionally on the thread of the bolt and prevents the nut from becoming unscrewed accidentally.

Alternatively the whole plate 1 may be of semi-soft material with the holes in the portions 1b and 1c so small that the bolt 4 will cut into the edges of said holes and form screw threads therein. This action would automatically strain the two portions 1b and 1c from their normal positions, and a friction drag would be produced as before as shown in Figure 2.

The structure shown could be modified by increasing the number of parallel portions having holes for applying a friction drag. Thus the plate could be turned back a third time parallel to the end surface of the nut so that it would have three holes for the bolt, or indeed it could be turned back any number of times and have any number of holes.

In any of the above arrangements the plate is of course shaped so that, in plan, it lies within the geometrical confines of the nut, and therefore does not interfere with the use of a wrench.

What we claim and desire to secure by Letters Patent is:

In a nut arranged with wrench engaging flats, a plate of resilient material folded upon itself with the folded portions disposed in parallel spaced relation and having axially alined threaded openings therein and of a cross sectional area to come within the flats of the nut, the free marginal portion of one folded plate portion being offset and the plate fixed at said offset portion to an end face of the nut with the plate portion from which it is offset spaced from said end of the nut and the plate openings being coaxially of the nut opening, and the screw threads of the threaded openings in the folded portions being out of phase with the screw threads of the nut and the spacing of the folded plate portion having the offset portion relative to the nut imparting additional friction effect to said folded plate portion.

RONALD D. KING.
NORMAN F. WOOD.

REFERENCES CITED

The following references are of record in the file of this patent:

UNITED STATES PATENTS

| Number | Name | Date |
| --- | --- | --- |
| 2,222,460 | Crowley | Nov. 19, 1940 |
| 2,281,056 | Tinnerman | Apr. 28, 1942 |
| 1,893,067 | Arenz | Jan. 3, 1933 |
| 1,126,225 | Judick | Jan. 26, 1915 |
| 1,039,017 | Bonness | Sept. 17, 1912 |
| 2,367,259 | Beach | Jan. 16, 1945 |
| 678,629 | Smith | July 16, 1901 |

FOREIGN PATENTS

| Number | Country | Date |
| --- | --- | --- |
| 228,002 | Great Britain | Jan. 29, 1925 |
| 286,120 | Great Britain | Mar. 1, 1928 |
| 122,361 | Austria | Apr. 25, 1931 |
| 326,050 | Great Britain | Mar. 6, 1930 |
| 10,597 | Great Britain | June 11, 1900 |